B. F. MANNING.
Fastening for Sled-Shoes.
No. 223,054.　　　　Patented Dec. 30, 1879.
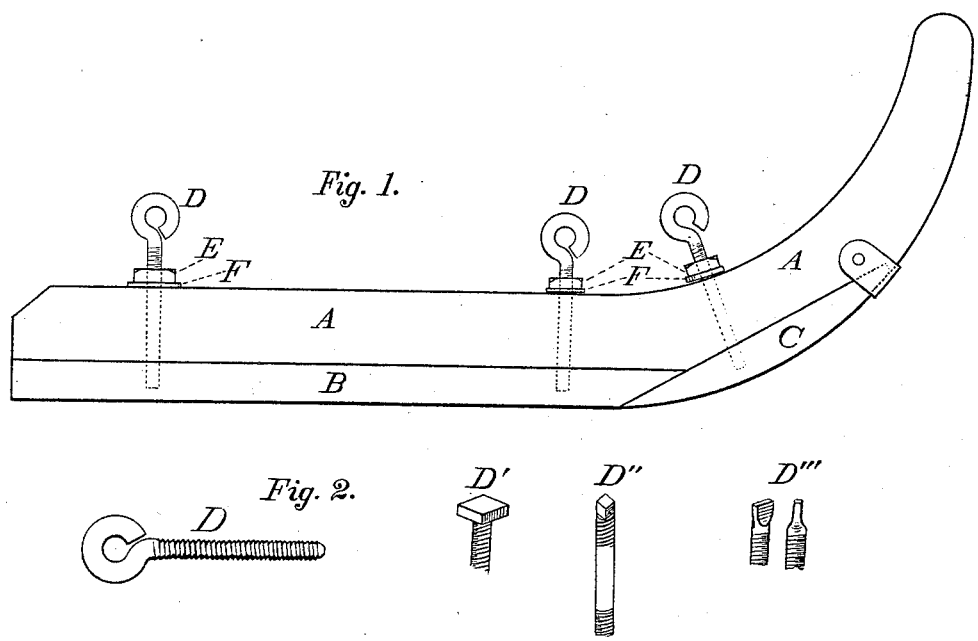
WITNESSES:
Thomas Hoge
Geo. L. Denney
INVENTOR:
Benjamin F. Manning

UNITED STATES PATENT OFFICE.

BENJAMIN F. MANNING, OF OAK FOREST, PENNSYLVANIA.

IMPROVEMENT IN FASTENINGS FOR SLED-SHOES.

Specification forming part of Letters Patent No. 223,054, dated December 30, 1879; application filed October 30, 1879.

*To all whom it may concern:*

Be it known that I, BENJAMIN FRANKLIN MANNING, of Oak Forest, in the county of Greene and State of Pennsylvania, have invented a new and useful Improvement in Fastening Sled-Soles to Sled-Runners, of which the following is a specification.

The common mode of fastening wooden soles or shoes to sleds is by wooden pins passing through the soles and up through the runners. These wooden pins, besides their liability to rot, are liable to swell by exposure to wet, so as to start cracks in the runners and soles if made of dry seasoned wood, and if made of green wood they shrink in dry weather, and become loose and inefficient.

Again, wooden pins have to be of such large size to secure the requisite strength that the pin-holes materially weaken the runners; and, further, these pins frequently have to be taken out (to put new soles on) when they are swelled or frozen so tight in the holes that they cannot be driven out and have to be bored out, when, if the auger or bit does not follow the center of the pin, it cuts away still more of the runner, thereby further weakening it and rendering the enlarged irregular holes unsuitable for further use.

To overcome these several difficulties is the object of my invention; and it consists in the use of peculiarly constructed metal screw-bolts instead of wooden pins. The metal, being so much stronger than wood, requires to be but half the size of the wooden pins to have greater strength than them, and, at the same time, leaves the sled-runner much stronger by reason of the proportionately smaller holes required through it, and the screw-thread upon the bolts enables them to hold the parts together much more securely than can be done by wooden pins.

Another important feature of my invention consists in providing means for adjusting the depth to which the points of the screws reach into the sole, and a means of retracting or withdrawing them gradually as the thickness of the sole wears away to prevent their protruding through to scratch upon the ground and be worn off too short for use.

In the accompanying drawings, Figure 1 shows a side elevation of a sled-runner, A, with sole B and fender C, in which said sole and fender are secured to the runner by the bolts D according to my invention.

In Fig. 2 is shown the bolt alone, with the tap or nut E and washer F removed. The top end of the bolts have an eye bent upon them, as shown in Figs. 1 and 2, through which any rod or bolt may be inserted to turn them; or common square heads, as shown at D', may be used, or small square ends, to be caught by a wrench, may be used, as shown at D'', over which the nut E may pass and be screwed down upon a thread cut down a suitable distance from the top end, while the bottom end may be threaded with a similar thread or with a different one specially suited for holding in wood; or the top of the bolt may be simply flattened, as shown at D''', so a wrench will turn it.

The washer F and nut E are placed upon the bolt a distance from the bottom of the bolt equal to the depth of the runner added to the depth it is desired to reach into the sole, thus making a measure of the depth to insert it; then the bolt is passed through a loosely-fitting hole in the runner; then screwed into a small tightly-fitting hole in the sole until the nut comes down to the top of the runner, when the nut is tightened up sufficiently to fetch the sole up solidly against the runner and hold the two firmly together. When the bottom of the sole wears off up to the bottom end of the bolt it is screwed back a half inch or more, and the nut E screwed down the same distance to the runner again; and this setting back of the bolts is repeated till the soles are worn out, when the same bolts are screwed down again into a new sole, as before.

I have also contemplated the use of the nuts set rigidly in the body of the runner and screwing the bolts through them, and also the use of the bolts screwed through tightly-fitting holes in the runners without the use of nuts, which works well when the sole fits up with a solid bearing at the place where the bolt enters, but cannot be used to draw the parts together as with the use of the nuts on top of the runner, as described.

Metal soles may be fastened to runners the same way as the wooden ones by cutting threads in the holes in them to fit the screw-bolts, and not be liable to come off as soon as worn below the depth of the common counter-sunk bolt-heads, as now made.

The bolts may be galvanized, oiled, painted, or japanned, to prevent rusting, and a thin gum washer used under the metal washers F, to exclude moisture from the holes.

I claim—

The combination of the sole, runner, and adjustable screw-bolts, arranged and operating in the manner shown and described.

BENJAMIN F. MANNING.

Witnesses:
 THOMAS HOGE,
 GEO. L. DENNEY.